Figure 1:
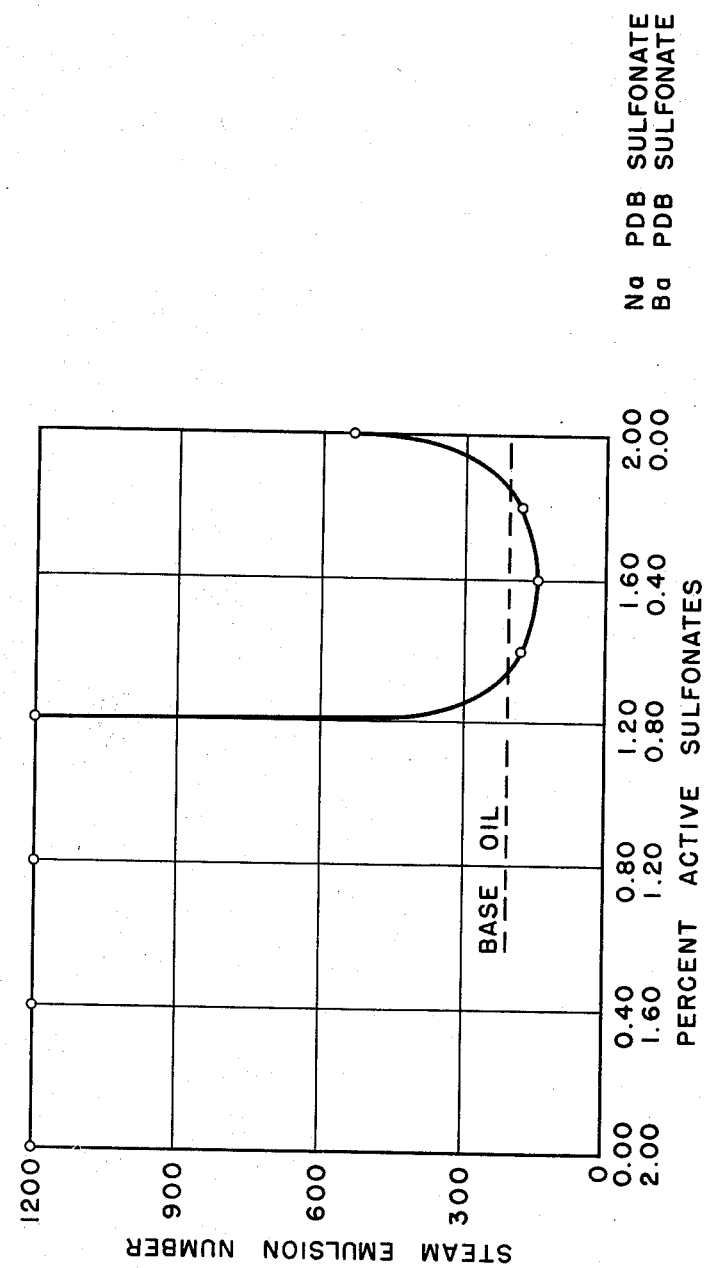

June 28, 1960

R. L. CARLYLE ET AL 2,943,052

LUBRICATING COMPOSITION

Filed Dec. 8, 1955

3 Sheets-Sheet 1

INVENTORS.
ROBERT L. CARLYLE
EARL F. MORRIS
BY
Floyd Trimble
ATTORNEY

INVENTORS.
ROBERT L. CARLYLE
EARL F. MORRIS
BY
Floyd Trimble
ATTORNEY

United States Patent Office 2,943,052
Patented June 28, 1960

2,943,052
LUBRICATING COMPOSITION

Robert Lewis Carlyle, Lake Jackson, Tex., and Earl F. Morris, Ponca City, Okla., assignors to Continental Oil Company, Ponca City, Okla., a corporation of Delaware Filed Dec. 8, 1955, Ser. No. 551,957

11 Claims. (Cl. 252—33)

The invention relates to mineral lubricating oil compositions having reduced emulsion characteristics, improved dielectric constant strength, and a high water loss rate and is a continuation-in-part of our co-pending application entitled "Lubricating Composition," Serial No. 515,074, filed June 13, 1955, now abandoned. It is more particularly concerned with mineral oil compositions suitable for use in turbines, transformers, compressors, transmissions, etc.

As is well known to those skilled in the art, a good turbine oil must not only possess maximum resistance to oxidation, a high viscosity index and anti-rust properties, but in addition must possess the ability to separate rapidly from water. Compounds are available, the use of which in an oil overcomes specific defects in the oil. Heretofore the use of a particular additive in the oil to overcome one defect has magnified other defects of the oil. As for example, many of the oxidation and rust inhibitors are polar compounds. The presence of such in an oil increases the emulsive tendencies of the oil to such an extent that it becomes unsuitable for turbine use or other use where the formation of emulsions would be detrimental. When an oil is used as a transformer oil it must possess two properties, one, the resulting composition must have a high dielectric strength and, two, it must have a high water loss rate. The latter is important because it is necessary to remove any water contained in the transformer oil composition prior to use. As is well known, the presence of water reduces the dielectric strength of the oil greatly. Moderately treated mineral oils have been used for a number of years as transformer oils. Such an oil gradually deteriorates in service, due to oxidation. Acidic materials are formed during the oxidation process, which materials attack the insulation of the transformer wires, thus leaving the wires partially exposed to the oil. Furthermore, an oil containing these acidic materials serves as an electrical conductor rather than an insulator. To overcome the disadvantages inherent in the moderately treated mineral oils, halogenated organic compounds have been proposed. Specific halogenated compounds include the halogenated aromatic compounds such as chlorinated biphenyl and chlorinated naphthalene. These materials are characterized by possessing a high dielectric constant, thermostability, resistance to oxidation, non-inflammability and other valuable properties. It has been found, however, that when these compounds are exposed to elevated temperatures and high voltages they partially decompose, liberating hydrogen halides which are very corrosive to metals and have an exceedingly deleterious action on paper insulation. Moreover, in the case of capacitors operating on alternating current, these decomposition products result in an increase in the power factor of the dielectric material.

It is therefore a principal object of the present invention to provide new compositions of matter wherein the foregoing objectionable properties are either completely eliminated or substantially reduced. Another object of our invention is to provide a lubricating oil composition having improved resistance to oxidation and rust formation. Yet another object of this invention is to provide a mineral oil composition having an improved dielectric strength. A further object of the present invention is to provide a mineral oil composition having reduced tendencies to form lasting emulsions. A still further object of our invention is to provide a mineral oil composition having a high water loss rate. Other objects and advantages of the present invention will become apparent to those skilled in the art from the following detailed description.

In brief, the foregoing objects and advantages are obtained by incorporating in a mineral oil of the proper physical characteristics a minor amount of a mixture consisting of an alkali metal sulfonate and an alkaline earth metal sulfonate. We have found that by incorporating a mixture of the two sulfonates in an oil the resulting oil composition will possess reduced oxidation susceptibilities and improved demulsibility characteristics as well as an improved dielectric strength and increased water loss rate. As to the amount of the mixture of the sulfonates, that may vary from about 1.5 to 6.0 percent based upon the total weight of the composition. Suitable quantities of the alkali metal sulfonate and the alkaline earth metal sulfonate on a weight ratio basis varies from about 70:30 to 90:10 respectively.

The alkali metal and alkaline earth metal sulfonates useful in the process of this invention are alkali metal and alkaline earth metal salts of certain sulfonic acids. In general, the alkaryl sulfonates must be oil soluble and for that reason suitable alkaryl sulfonic acids are those containing from about 20 to about 30 carbon atoms. They may be obtained by the sulfonation of aromatic petroleum fractions or hydrocarbons obtained by the polymerization of low molecular weight olefins such as ethylene, propylene, or mixtures thereof. Suitable alkaryl sulfonates are well known in the art. They are prepared by the sulfonation of alkaryl hydrocarbons that may be obtained from aromatic petroleum fractions or by the alkylation of aromatic hydrocarbons such as benzene, toluene, xylene, or naphthalene with an alkylating agent. The alkylation agent may be an olefin obtained by the cracking of a hydrocarbon such as wax, kerosene, or other petroleum fraction or obtained by polymerization of a low molecular weight olefin such as ethylene, propylene, or mixtures or it may be obtained by synthesis from carbon monoxide and hydrogen in the presence of a catalyst. Other suitable alkylation agents are alkyl halides. Excellent results are attained using the specific sulfonate produced by the sulfonation and neutralization of the detergent alkylate sometimes known as postdodecylbenzene consisting of monoalkylbenzenes and dialkylbenzenes in the approximate ratio of 2:3. Its typical physical properties are as follows:

| | |
|---|---|
| Specific gravity at 38° C. | 0.8649 |
| Average molecular weight | 365 |
| Percent sulfonatable | 88 |

A.S.T.M., .D-158 Engler:

| | | |
|---|---|---|
| I.B.P. | °F | 647 |
| 5 | °F | 682 |
| 50 | °F | 715 |
| 90 | °F | 760 |
| 95 | °F | 775 |
| F.B.P. | °F | 779 |
| Refractive index at 23° C. | | 1.4900 |

Viscosity at:

| | | |
|---|---|---|
| −10° C. | centipoises | 2800 |
| 20° C. | do | 280 |
| 40° C. | do | 78 |
| 80° C. | do | 18 |
| Aniline point | °C | 69 |
| Pour point | °F | −25 |

The alkali metal and the alkaline earth metal sulfonates useful in our invention may be either the neutral or the overbased salt. A method of preparing an overbased alkaline earth metal sulfonate is disclosed in the co-pending application of one of the present inventors, Serial No. 362,970, filed June 19, 1953, now abandoned, and assigned to the present assignee, which disclosure is made a part of this application.

In order to disclose the nature of the present invention still more clearly, the following illustrative examples will be given. It is to be understood that the invention is not to be limited to the specific conditions or details set forth in these examples except insofar as such limitations are specified in the appended claims. Parts given are parts by weight.

EXAMPLE 1

In this example a series of lubricating composition blends were prepared comprising 98 parts of 200 S.S.U. at 100° F., pale oil and 2 parts of the mixed sulfonates wherein the ratio of the sulfonates in the mixture was varied. The sodium postdodecylbenzene sulfonate used was prepared by neutralizing postdodecylbenzene sulfonic acid with sodium hydroxide. The overbased barium postdodecylbenzene sulfonate was prepared according to Example 12 of the co-pending application, Serial No. 362,970. Steam emulsion numbers of the blends of oils were determined in accordance to the methods described under A.S.T.M. designation D157–51T, page 94, A.S.T.M. Standards 1952, Part 5, Fuels, Petroleum Aromatic Hydrocarbons, Engine Anti-freezes, American Society for Testing Materials, Philadelphia, Pennsylvania, 1953. Pertinent data and test results are set forth in Table 1 below. The experiments are also plotted in Fig. 1.

Table 1

| Run | Percent Sulfonate A | Percent Sulfonate B | S.E. No. |
|---|---|---|---|
| 1 | 0.0 | 2.0 | 1200 |
| 2 | 0.2 | 1.8 | 1200 |
| 3 | 0.4 | 1.6 | 1200 |
| 4 | 0.6 | 1.4 | 1200 |
| 5 | 0.8 | 1.2 | 1200 |
| 6 | 1.0 | 1.0 | 1200 |
| 7 | 1.2 | 0.8 | 1200 |
| 8 | 1.4 | 0.6 | 180 |
| 9 | 1.6 | 0.4 | 150 |
| 10 | 1.8 | 0.2 | 180 |
| 11 | 2.0 | 0.0 | 540 |

S.E.=Steam emulsion number.
Sulfonate A=Sodium postdodecylbenzene sulfonate.
Sulfonate B=Overbased barium postdodecylbenzene sulfonate.

EXAMPLE 2

Various blends of the lubricating oil compositions containing 98 parts of 200 S.S.U. at 100° F., pale oil and 2 parts of the mixed sulfonates were subjected to an oxidation test. In this test an oil sample is oxidized by bubbling air through the oil at a rate of 1.5 liters per hour at 374° F., using 9 feet of iron wire as the catalyst, the time is then noted in number of hours required for 10 mg. of the pentane insolubles to form in a ten-gram sample of the oil blend. Pertinent data and test results are set forth in Table 2 below.

Table 2

| Run | Percent Sulfonate A | Percent Sulfonate B | Time in Hours |
|---|---|---|---|
| 1 | 0.0 | 0.0 | 14 |
| 2 | 1.50 | 0.50 | 72 |
| 3 | 1.64 | 0.36 | 96 |
| 4 | 1.72 | 0.28 | 96 |
| 5 | 2.00 | 0.0 | 60 |

Figure 2:
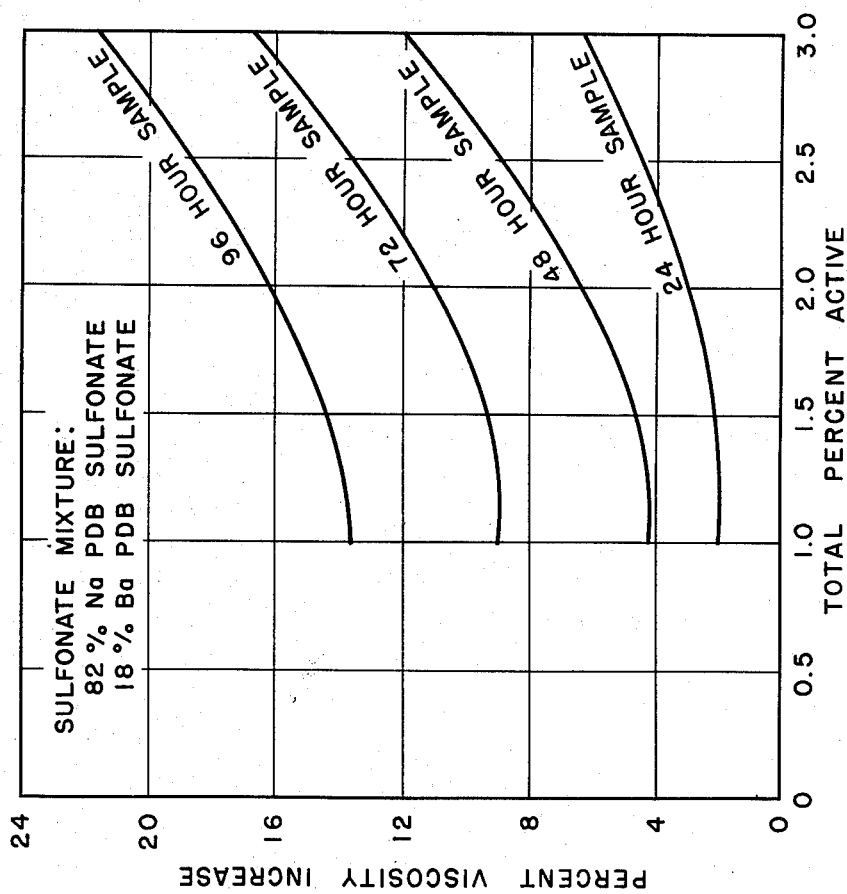

In Fig. 2 is shown the change in viscosity with time of the oil blend containing various amounts of the mixed sulfonates during the oxidation test described above. In this experiment, the sulfonate mixture consisted of 82 percent of sodium postdodecylbenzene sulfonate and 18 percent of the overbased barium postdodecylbenzene sulfonate.

Figure 3:
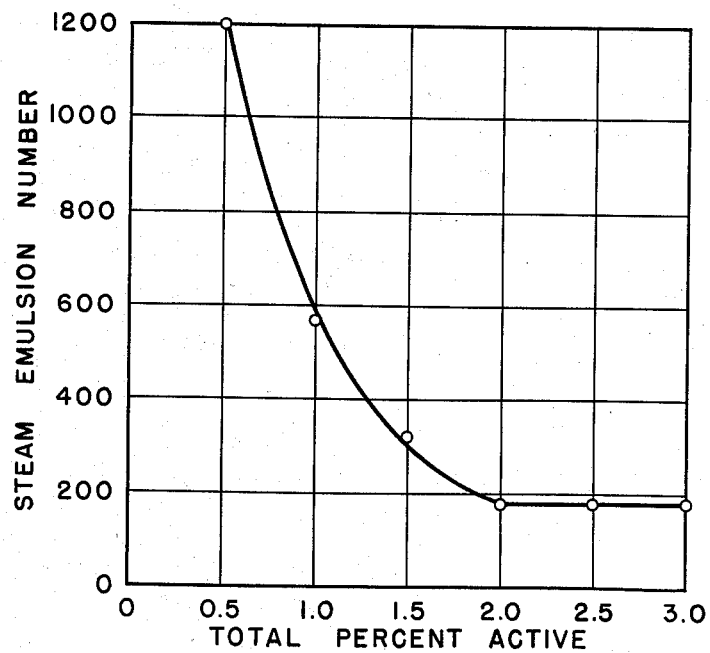

In Fig. 3 is plotted the effect of sulfonate level on steam emulsion number. The data of this figure were obtained using various amounts of a mixture consisting of 82 percent of the sodium postdodecylbenzene sulfonate and 18 percent of the overbased barium postdodecylbenzene sulfonate. The pale oil used was the same grade used in the other experiments, namely, 200 S.S.U. at 100° F.

EXAMPLE 3

Steam emulsion numbers and the number of hours required for 10 milligrams of the pentane insolubles to form in a ten-gram sample of the oil blend consisting of two parts of various mixed sulfonates in 98 parts of 200 S.S.U. at 100° F., pale oil were determined following the procedures described in Examples 1 and 2, respectively. Pertinent data and test results are set forth in Table 3 below.

Table 3

| Run | Sulfonate A, Percent | Sulfonate B, Percent | Sulfonate C, Percent | Sulfonate D, Percent | S.E. Numbers | Time in Hours |
|---|---|---|---|---|---|---|
| 1 | .82 | 0.18 | | | 1200+ | 72 |
| 2 | 1.64 | 0.36 | | | 180 | 96 |
| 3 | | | 0.82 | 0.18 | 1200+ | 36 |
| 4 | | | 1.64 | 0.36 | 1200+ | 36 |
| 5 | 0.82 | | | 0.18 | 1200+ | 60 |
| 6 | 1.64 | | | 0.36 | 900 | 84 |
| 7 | | 0.18 | 0.82 | | 1200+ | 60 |
| 8 | | 0.36 | 1.64 | | 690 | 84 |

Sulfonate C=Sonneborn's "Petronate-H."
Sulfonate D=Bray's "Synfonate #28."
Properties of Sonneborn's "Petronate-H" are as follows:

| | |
|---|---|
| Sulfonates percent by weight | 62 |
| Mineral oil do | 33 |
| Water do | 5 |
| Molecular weight of sulfonate | 440 to 470 |
| Specific gravity, 60° F. | 1.02 |
| Flash point, °F., open cup | 450 |
| Empirical formula | $C_{29}H_{51}SO_3Na$ |
| $SO_3$ content percent | 17.5 |
| Ash content as $Na_2SO_4$ do | 15.5 |

The properties of Bray's "Synfonate #28" are similar to Sonneborn's "Petronate-H." Its properties are as follows:

| | |
|---|---|
| Sulfonates percent | 40 |
| Molecular weight of sulfonate | 940 |
| Ash content as $CaSO_4$ percent | 8.2 |
| Empirical formula | $(C_{29}H_{51}SO_3)_2Ca$ |

EXAMPLE 4

Examples 1 and 2 were repeated with the exception that other overbased alkaline earth metal sulfonates were substituted for the barium postdodecylbenene sulfonate listed in Tables 1 and 2. Specific sulfonates used were as follows: Overbased calcium and magnesium postdodecylbenzene sulfonates and overbased calcium and strontium mahogany sulfonates. The results obtained were similar to those obtained using the overbased barium postdodecylbenzene sulfonate.

The overbased calcium postdodecylbenzene sulfonate was produced by the following procedure: A suspension consisting of 80 parts of methanol and 24 parts of calcium hydroxide was agitated vigorously while 400 parts of a 50 percent solution of postdodecylbenzene sulfonic acid in 170 S.S.U. pale oil at 100° F. was added. The mixture was blown with carbon dioxide for 1½ hours after which it was heated to 150° C. to remove the solvents and decompose the calcium complex. After filtering, the product had a base number of 83 mg. KOH/g. An overbased strontium postdodecylbenzene sulfonate was prepared in a similar manner. The base number of the overbased strontium sulfonate was 80 mg. KOH/g. Overbased calcium and strontium mahogany sulfonates were also prepared in a similar manner wherein mahogany sulfonic acids were substituted for the postdodecylbenzene sulfonic acid. The base numbers of the two mahogany sulfonates were 92 and 90 mg. KOH/g., respectively.

EXAMPLE 5

In this example a series of lubricating composition blends were prepared comprising 200 S.S.U. at 100° F., pale oil and varying amounts of the mixed sulfonates. The sodium postdodecylbenzene sulfonate used was prepared by neutralizing postdodecylbenzene sulfonic acid with sodium hydroxide. The overbased barium postdodecylbenzene sulfonate was prepared in accordance to the method described in Example 1. Dielectric strength of the blends of oil were then determined. The experiments together with the results are summarized in Table 4 below:

| Concentration of the Postdodecylbenzene Sulfonate (Weight percent) | | Dielectric Strength (kv.) |
|---|---|---|
| Overbase Barium | Sodium | |
| None (blank) | None (blank) | 22 |
| 0.18 | 0.82 | 24 |
| 0.36 | 1.64 | 35 |
| 0.54 | 2.46 | 35 |
| 0.90 | 4.10 | 28 |

A remarkable feature of this invention is the wholly unexpected, greatly enhanced value of the dielectric strength of an oil containing the mixture of sulfonates as compared to an oil not incorporating these additives. This latter point is very important, and as a general rule the minimum value for a dielectric strength for a transformer oil is about 20 kilovolts. When the optimum amount of the additives are incorporated in the oil, the dielectric strength of the oil is increased more than 50 percent. Specifically, a 200 pale oil suitable as a transformer oil had dielectric strength of 22 kilovolts, and upon incorporating the two additives the dielectric strength was increased to 35 kilovolts.

As pointed out above, it is very important that a transformer oil possess a high water loss rate. Accordingly, a rough test was set up for measuring water loss rates for the various oil blends. This test consists in adding 300 ml. of the blend to be tested and 30 ml. of water to a beaker used for the A.S.T.M. rust test. The beaker, oil, water, and rust test stirrer were weighed as a unit and placed in an oil bath at 140° F. The mixture was stirred and at the end of 2 to 3 hours the unit was cleaned on the outside and weighed. The loss in weight was taken as the amount of water evaporated. After 12 hours the blank (lubricating oil less the sulfonates) had lost a maximum of 10 percent or (3 ml. of water). Upon the other hand, a lubricating oil blend comprising 0.16 percent overbased barium postdodecylbenzene sulfonate and 1.64 percent sodium postdodecylbenzene sulfonate in 12 hours had lost 80 percent or 24 ml. of water. In other words, the addition of the sulfonates increased the rate at which the water evaporated by about 8 times.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A compounded mineral oil composition consisting essentially of from about 98.0 to about 98.5 weight percent of a mineral lubricating oil and from about 2.0 to about 1.5 weight percent of an oil soluble mixture consisting of an alkali metal sulfonate and an alkaline earth metal sulfonate in a weight ratio of from 7:3 to 9:3, said sulfonates being alkaryl sulfonates containing from about 20 to about 30 carbon atoms.

2. The composition of claim 1 wherein the alkali metal is sodium.

3. The composition of claim 1 wherein the alkali metal sulfonate is a sodium sulfonate of a detergent alkylate consisting of monoalkylbenzenes and dialkylbenzenes in the approximate ratio of 2:3, said alkylate having an average molecular weight of about 365 and wherein the alkaline earth metal sulfonate is an overbased alkaline earth metal mahogany sulfonate.

4. The composition of claim 1 wherein said sulfonates are sulfonates of a detergent alkylate consisting of monoalkylbenzenes and dialkylbenzenes in the approximate ratio of 2:3, said alkylate having an average molecular weight of about 365.

5. The composition of claim 4 wherein the alkali metal is sodium.

6. A compounded mineral oil composition consisting essentially of from about 98.0 to about 98.5 weight percent of a mineral lubricating oil and from about 2.0 to about 1.5 weight percent of an oil soluble mixture consisting of sodium sulfonate and an overbased alkaline earth metal sulfonate in the weight ratio of from 7:3 to 9:1, wherein said sulfonates are sulfonates of a detergent alkylate consisting essentially of monoalkylbenzenes and dialkylbenzenes in the approximate ratio of 2:3, said alkylate having an average molecular weight of about 365.

7. The composition of claim 6 wherein the alkaline earth metal is barium.

8. The composition of claim 6 wherein the alkaline earth metal is calcium.

9. The composition of claim 6 wherein the alkaline earth metal is magnesium.

10. The composition of claim 6 wherein the alkaline earth metal is strontium.

11. A compounded mineral oil composition consisting essentially of about 98 weight percent of a mineral lubricating oil and about 2 weight percent of an oil soluble mixture consisting of sodium sulfonate and overbased barium sulfonate in the weight ratio of from about 7:3 to about 9:1, wherein said sulfonates are sulfonates of a detergent alkylate consisting essentially of monoalkylbenzenes and dialkylbenzenes in the approximate ratio of 2:3, said alkylate having an average molecular weight of about 365.

References Cited in the file of this patent

UNITED STATES PATENTS

| 2,412,634 | Schwartz | Dec. 17, 1946 |
| 2,418,894 | McNab et al. | Apr. 15, 1947 |
| 2,501,731 | Mertes | Mar. 28, 1950 |
| 2,533,878 | Clark et al. | Dec. 12, 1950 |
| 2,606,872 | Gasser et al. | Aug. 12, 1952 |
| 2,671,757 | Wisherd | Mar. 9, 1954 |
| 2,677,618 | Deiman et al. | May 4, 1954 |
| 2,758,972 | Burgmann et al. | Aug. 14, 1956 |

FOREIGN PATENTS

| 709,587 | Great Britain | Jan. 29, 1952 |